United States Patent [19]

Lee

[11] Patent Number: 5,721,629
[45] Date of Patent: Feb. 24, 1998

[54] DUAL-FOCUS FORMING METHOD AND APPARATUS THEREOF

[75] Inventor: Chul-woo Lee, Seoul, Rep. of Korea

[73] Assignee: Samsung Electronics Co., Ltd., Suwon, Rep. of Korea

[21] Appl. No.: 585,251

[22] Filed: Dec. 26, 1995

[30] Foreign Application Priority Data

Jun. 26, 1995 [KR] Rep. of Korea .................. 95-17595

[51] Int. Cl.⁶ .................. G02B 5/32; G02B 5/18; G11B 7/00
[52] U.S. Cl. .................. 359/15; 359/19; 359/566; 369/44.23; 369/44.14; 369/109
[58] Field of Search .................. 359/17, 18, 19, 359/565, 566, 37, 15; 369/44.12, 44.14, 44.23, 109, 112; 385/37

[56] References Cited

U.S. PATENT DOCUMENTS

| | | |
|---|---|---|
| 3,913,076 | 10/1975 | Lehureau . |
| 3,971,002 | 7/1976 | Bricot et al. . |
| 5,015,835 | 5/1991 | Ohuchida et al. .................. 369/44.23 |
| 5,245,596 | 9/1993 | Gupta et al. .................. 369/44.14 |
| 5,446,565 | 8/1995 | Komma et al. . |
| 5,446,723 | 8/1995 | Best et al. . |
| 5,526,336 | 6/1996 | Park et al. . |
| 5,563,873 | 10/1996 | Ito et al. . |

FOREIGN PATENT DOCUMENTS

| | | |
|---|---|---|
| 63-200328 | 8/1988 | Japan . |
| 64-27043 | 1/1989 | Japan . |
| 3-173942 | 7/1991 | Japan . |
| 3-250437 | 11/1991 | Japan . |
| 4-339330 | 11/1992 | Japan . |
| 5-6546 | 1/1993 | Japan . |
| 7-98431 | 4/1995 | Japan . |
| 7-302437 | 11/1995 | Japan . |

OTHER PUBLICATIONS

Y. Komma et al., "Dual Focus Optical Head for 0.6 mm and 1.2 mm Disks," *Optical Review*, vol. 1, No. 1, 1994, pp. 27–29.

*Primary Examiner*—Paul M. Dzierzynski
*Assistant Examiner*—Audrey Chang
*Attorney, Agent, or Firm*—Burns, Doane, Swecker & Mathis, L.L.P.

[57] ABSTRACT

A dual-focus forming method for both a 0.6 mm disk and a 1.2 mm disk, which prevents the increase of wave-front aberration caused by a refractive lens, utilizes a hologram lens having hologram devices respectively formed on the receive and emitting-planes of a transparent plate. The receiving-plane hologram device diffracts incident light from a light source into a zero-order light beam and a 1st-order diffracted light beam, and the emitting-plane hologram device diffracts the zero-order transmitted light beam and 1st-order diffracted light beam into two 1st-order diffracted light beams for being focused onto one or the other disk. The hologram lens exhibits good optical performance due to its low wave-front aberration and is easy to manufacture at low cost.

13 Claims, 7 Drawing Sheets

DUAL-FOCUS FORMING METHOD AND APPARATUS THEREOF

BACKGROUND OF THE INVENTION

The present invention relates to a dual-focus forming method which is adopted for an optical pickup for recording or reproducing information optically, and more particularly, to a dual-focus forming method for forming a light spot on the recording planes of disks having different thicknesses, and an apparatus thereof.

As an optical recording medium, a well-known compact disk has a substrate thickness of 1.2 mm, with 0.6 mm disks having been recently developed for high-density recording. In order to read the information stored at high density, the size of a focused optical spot should be reduced. For this purpose, it is necessary to use a short-wavelength light source and an objective lens having a large numerical aperture.

However, since an objective lens having a large numerical aperture is extremely unstable, causing aberration when the disk is tilted, the disk's slope must be tightly controlled during reproduction. This aberration increases in proportion to the thickness and slope of the disk substrate. Therefore, a slope error tolerance can be increased by making the substrate as thin as possible, thereby realizing practical high-density reproduction. With the advent of disks of varying thickness, compatible optical pickup is required for the various kinds (different thicknesses) of disks.

Figure 1:
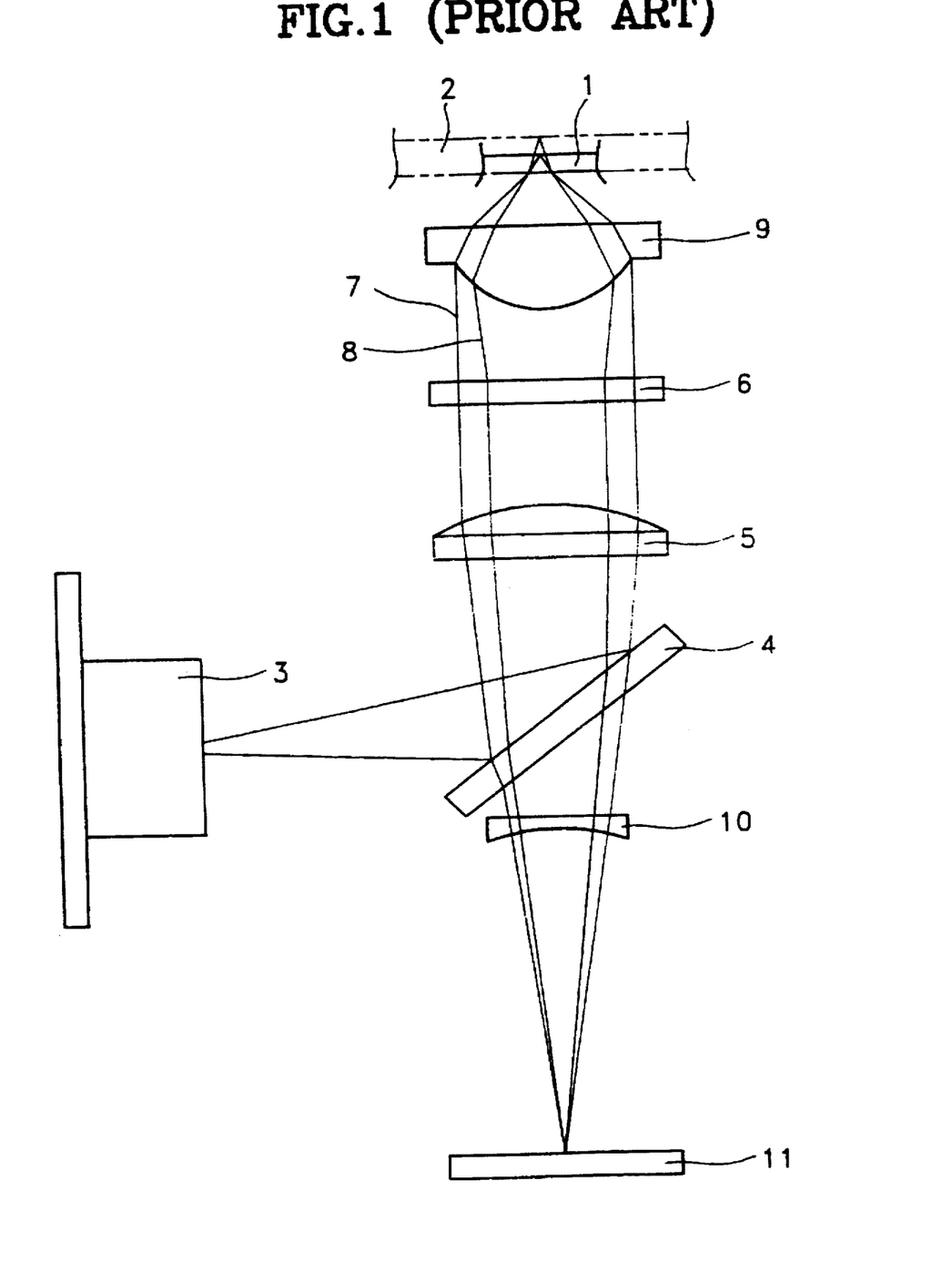
FIG. 1 is a schematic view showing the construction of a conventional dual-focus forming apparatus.

FIG. 1 shows a conventional dual-focus optical pickup for 0.6 mm disks and 1.2 mm disks, by which spherical aberration caused by different disk thicknesses is compensated for. Here, a reference numeral 1 is a 0.6 mm disk and reference numeral 2 is a 1.2 mm disk, with one or the other disk being loaded into a disk drive (not shown).

Referring to FIG. 1, a conventional dual-focus optical pickup is constituted by a laser diode 3 for generating a laser light beam, a half mirror 4 for partially reflecting and partially transmitting the light beam, a collimating lens 5 for directing the reflected light beam as a collimated light toward the loaded disk 1 or 2, a hologram lens 6 for diffracting the collimated light, and an objective lens 9 for focusing the zero-order transmitted light beam 7 and 1st-order diffracted light beam 8 of hologram lens 6 onto disks 1 and 2, respectively. Also, a sensor lens 10 is provided for receiving the information-bearing reflected light beam of disk 1 or disk 2, to be detected by a photo-detector 11.

Figure 2:
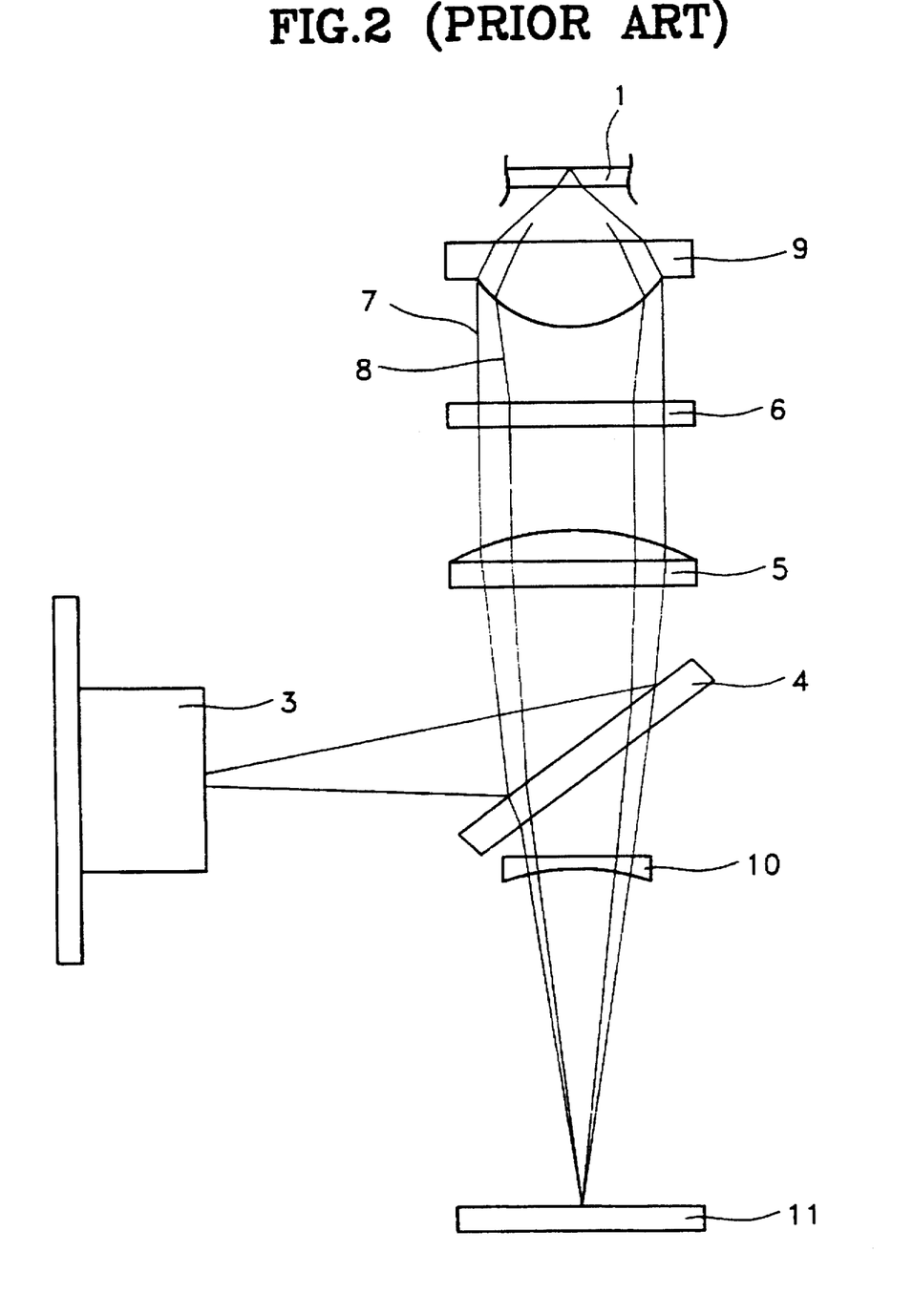
FIG. 2 shows the optical path for a 0.6 mm disk in the conventional dual-focus forming apparatus.
Figure 3:
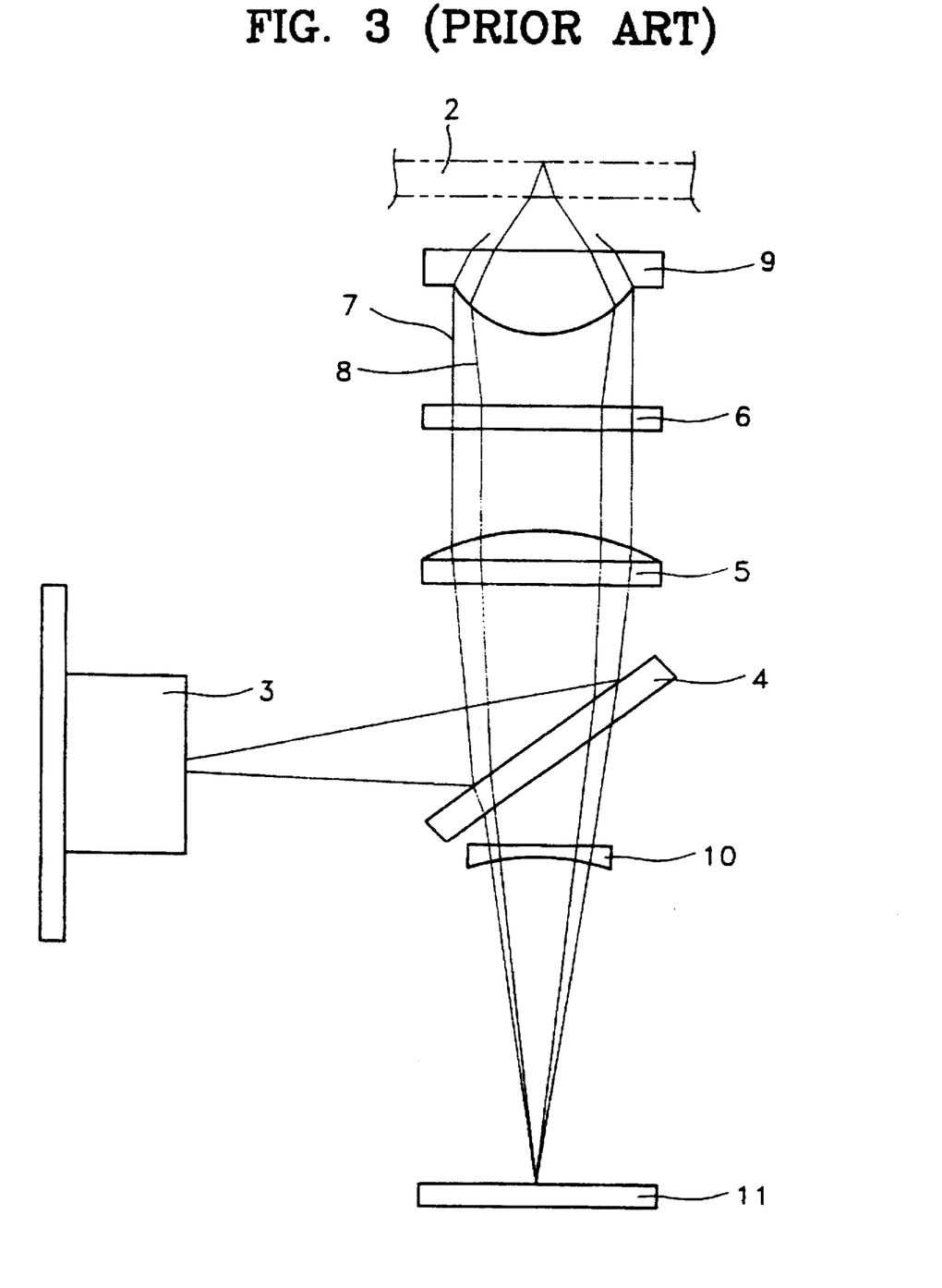
FIG. 3 shows the optical path for a 1.2 mm disk in the conventional dual-focus forming apparatus.

Here, the 0.6 mm disk 1 is read using the zero-order transmitted light beam 7, as shown in FIG. 2, and the 1.2 mm disk 2 is read using the 1st-order diffracted light beam 8, as shown in FIG. 3. That is to say, the difference between emission angles of zero-order transmitted light beam 7 and 1st order diffracted light beam 8 is utilized. Hologram lens 6 is blazed to diffract either the +1st-order diffracted light beam or the π1st-order diffracted light beam in order to prevent the lowering of the light efficiency.

However, in the above conventional case which uses a refractive objective lens and a hologram lens together, the objective lens should have a high-order aspherical coefficient, which makes its manufacture difficult. Also, it is not easy to fabricate nor to adjust these lenses, so that errors during fabrication result in poor device performance. Especially, the wave-front aberration increases in inverse proportion to wavelength, so that when a shorter wavelength light source is used, the aberration becomes much worse.

SUMMARY OF THE INVENTION

To solve the above problems, it is therefore an object of the present invention to provide a dual-focus forming method using two hologram devices instead of a refractive lens, and an apparatus thereof.

To accomplish the above object, there is provided a dual-focus forming method for forming respective light spots on first and second disks having different thicknesses, the method comprising the steps of: generating a light beam from a light source; diffracting the generated light beam by means of a first hologram device; re-diffracting a zero-order transmitted light beam and 1st-order diffracted light beam of the first hologram device by means of a second hologram device, wherein 1st-order diffracted light beam of the second hologram device, being generated from the zero-order transmitted light beam of the first hologram device, is focused on the first disk, and 1st-order diffracted light beam of the second hologram device, being generated from the 1st-order diffracted light beam of the first hologram device, is focused on the second disk.

Also, to accomplish the above object, there is provided a dual-focus forming apparatus, having means for detecting a signal corresponding to the light beam reflected from loaded first and second disks having different thicknesses, for forming respective light spots on the first and second disks, the apparatus comprising: a light source for generating a light beam; a first hologram device for diffracting the generated light beam; and a second hologram device for re-diffracting the light beam diffracted by the first hologram device, wherein 1st-order diffracted light beam of the second hologram device, being generated from the zero-order transmitted light beam of the first hologram device, is focused on the first disk, and 1st-order diffracted light beam of the second hologram device, being generated from the 1st-order diffracted light beam of the first hologram device, is focused on the second disk.

BRIEF DESCRIPTION OF THE DRAWINGS

The above objects and advantages of the present invention will become more apparent by describing in detail a preferred embodiment thereof with reference to the attached drawings in which:

FIGS. 5 and 6 are partial views of the optical pickup of FIG. 4, in which FIG. 5 shows the optical path for a 0.6 mm disk and FIG. 6 shows the optical path for a 1.2 mm disk.

DETAILED DESCRIPTION OF THE INVENTION

In the present invention, instead of a refractive objective lens, two hologram devices are used.

Figure 4:
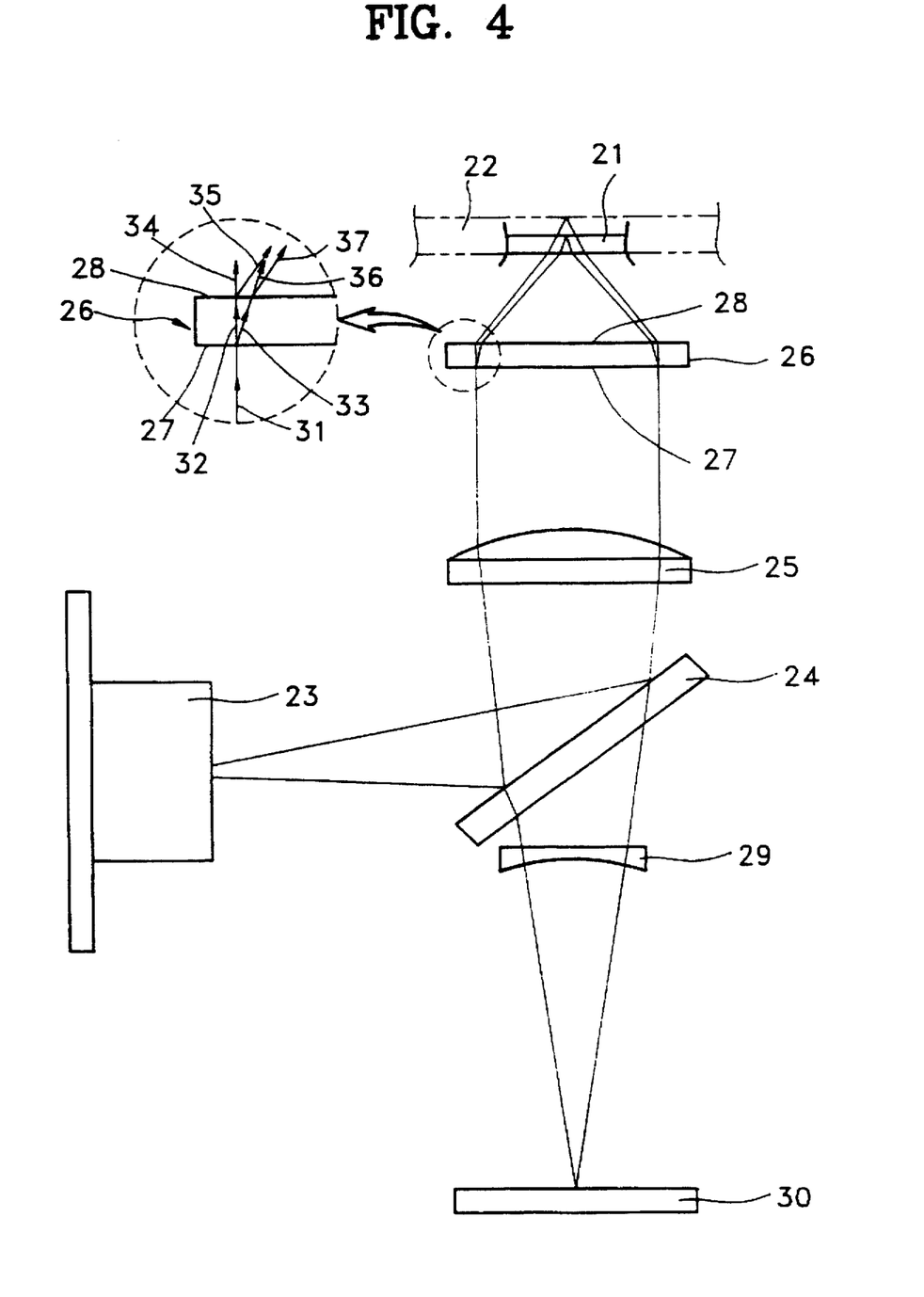
FIG. 4 is a schematic view showing the construction of an optical pickup according to the a dual focus forming method of the present invention, wherein an enlarged view is provided for explaining the optical paths.

In FIG. 4, a reference numeral 21 indicates a 0.6 mm disk, and 22 is a 1.2 mm disk. Either disk 21 or 22 is installed within a drive (not shown).

As shown in FIG. 4, the optical pickup adopting the dual-focus forming method according to the present invention includes a laser diode 23 for generating a laser light beam, a half mirror 24 for partially reflecting and partially transmitting the generated light beam, a collimating lens 25 for making the light beam reflected from half mirror 24 parallel and directing it toward disk 21 or 22, a hologram lens 26 having hologram devices 27 and 28 respectively formed on the light-receiving plane and light-emitting plane of a transparent plate, for diffracting the collimated light from collimating lens 25 and focusing the diffracted light on disk 21 or 22, and a sensor lens 29 and photo-detector 30 which are disposed for detecting a signal from the reflected light from disk 21 or 22.

Figure 5:
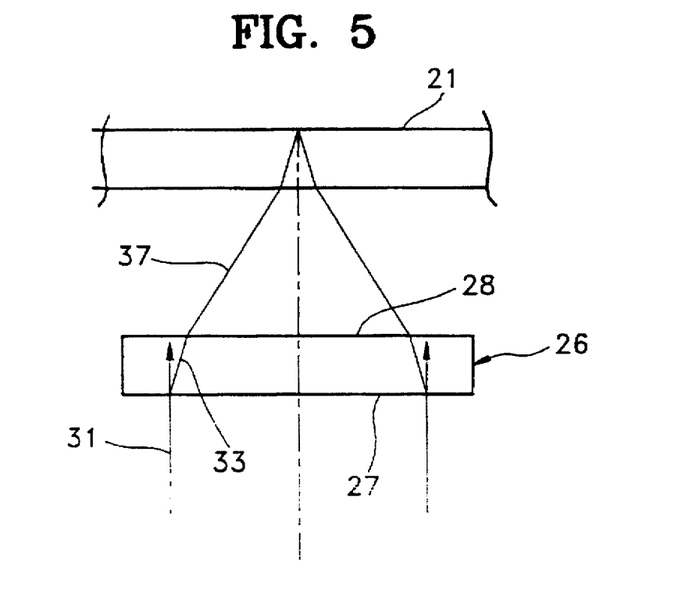
Figure 6:
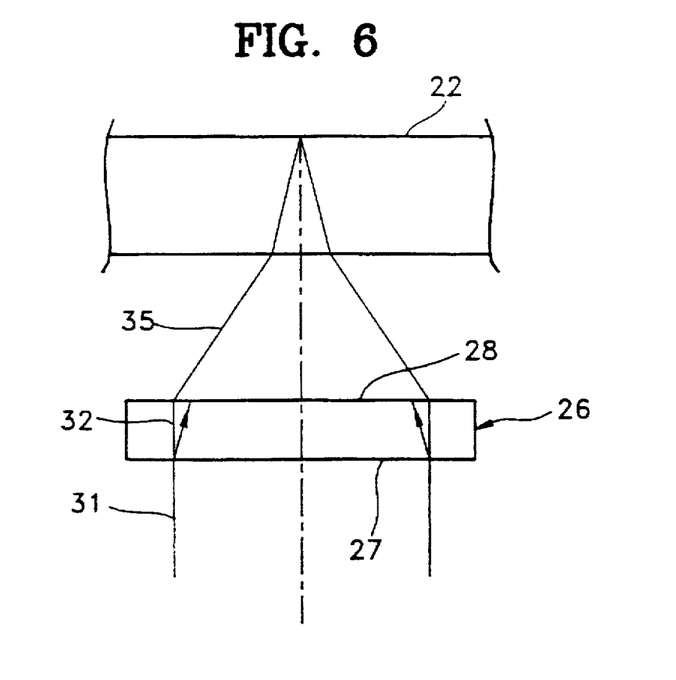

In such an optical pickup, hologram lens 26 diffracts the incident light twice so as to form two light spots corresponding to disks 21 and 22, respectively. Referring to the enlarged view of FIG. 4, the incident light 31 is diffracted into a zero-order light beam 32 and a 1st-order diffracted light beam 33 by means of receiving-plain hologram 27 of hologram lens 26. The zero-order transmitted light beam 32 of receiving-plane hologram device 27 is re-diffracted into a zero-order light beam 34 and a 1st-order diffracted light 35 by means of emitting-plane hologram device 28 of hologram lens 26. Also, 1st-order diffracted light beam 33 of receiving-plane hologram 27 is diffracted into a zero-order light beam 36 and a 1st-order diffracted light beam 37. Here, zero-order light beam 34 is emitted in a non-converging state, and first diffracted light beams 35 and 37 are emitted in a converging state. Here, the respective emitting angles are different from each other. Of these first-diffracted light beams 35 and 37, the converged 1st-order diffracted light beam 37 is used in reading the thinner disk 21, as shown in FIG. 5, and the converged 1st-order diffracted light beam 35 is used in reading the thicker disk 22, as shown in FIG. 6.

Figure 7A:
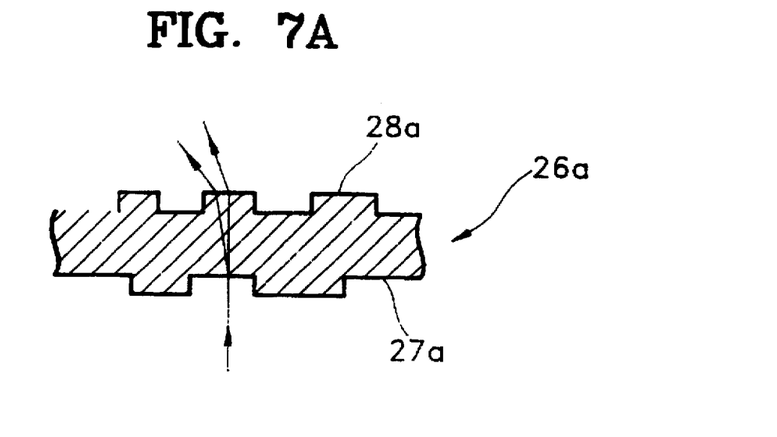
FIGS. 7A, 7B and 7C show various types of hologram lenses adopted in the optical pickup shown in FIG. 4.
Figure 7B:
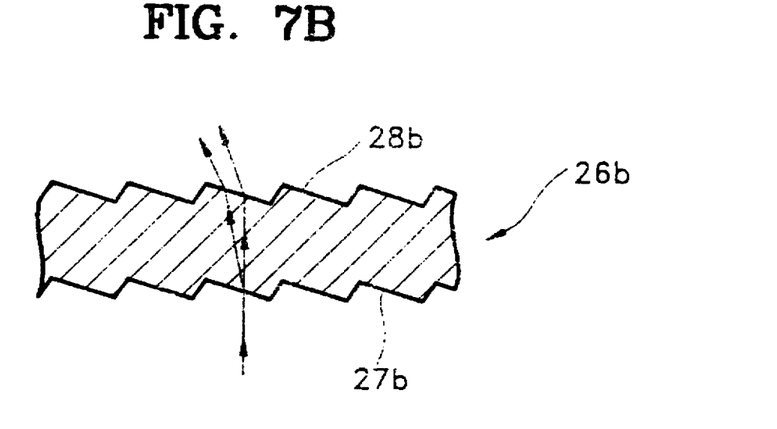
Figure 7C:
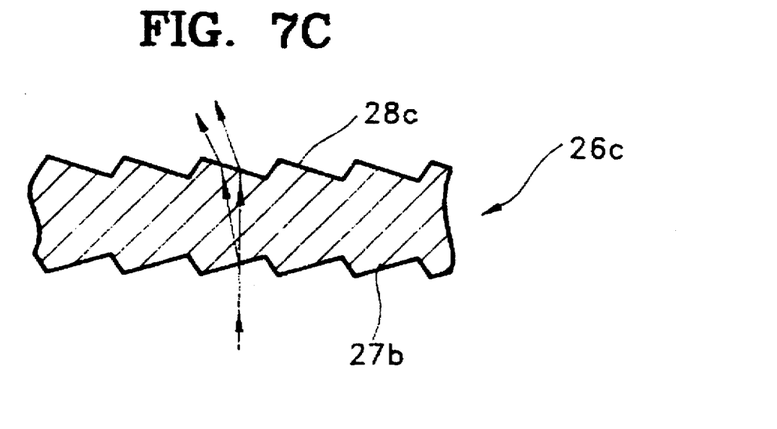

FIGS. 7A, 7B and 7C show various types of the above described hologram lens 26. Hologram lens 26a shown in FIG. 7A has hologram devices 27a and 28a formed on both sides thereof in a stepped pattern, which lowers light efficiency. However, these devices have advantages in that they are easy to manufacture and exhibit low aberration. Hologram lens 26b shown in FIG. 7B has hologram devices 27b and 28b blazed in a sawtooth pattern with both being slanted in the same direction. This configuration increases light efficiency by preventing hologram devices 27b and 28b from diffracting incident light into +1st- and π1st-order light beams, respectively. Hologram lens 26c shown in FIG. 7C has hologram devices 27c and 28c blazed in a sawtooth pattern with both being slanted in the opposite direction. This configuration increases light efficiency and reduces aberration because the increasing aberration is offset when the light is slantingly incident to the respective hologram devices 27c and 28c.

The following lens data are required for designing hologram lenses 26a, 26b and 26c with respect to 0.6 mm disk and 1.2 mm disk, wherein hologram lenses 26a, 26b and 26c each have a substrate thickness of 1 mm and a substrate refractive index of 1.515.

criteria for receiving-plane hologram device 27
  objective point of hologram: π75 mm
  objective point of reference light: ∞
  aspherical surface coefficients: $0.72e^{-2}$, $\pi 0.15e^{-1}$, $0.51e^{-2}$, $0.22e^{-2}$, $0.34e^{-3}$, $\pi 0.12e^{-3}$ and $\pi 0.92e^{-4}$
criteria for emitting-plane hologram device 28
  objective point of hologram: π7.5 mm
  objective point of reference light: ∞
  aspherical surface coefficients: $0.46e^{-2}$, $\pi 0.14e^{1}$, $\pi 0.18e^{1}$, $0.92e^{-0}$, $\pi 0.27e^{-0}$, $0.43e^{-1}$ and $\pi 0.27e^{-2}$ Hologram lenses 26a, 26b and 26c are positioned 1.79 mm from 0.6 mm disk and 2.47 mm from 1.2 mm disk.

Figure 8:
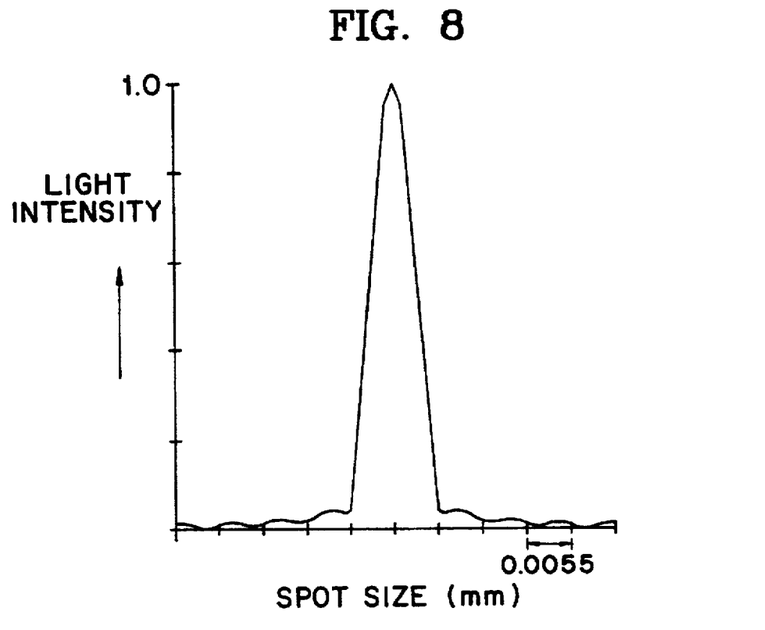
FIGS. 8 and 9 are profiles showing the size of the light spots formed according to the present invention and the distributions of light intensities thereof, for 0.6 mm and 1.2 mm disks, respectively.
Figure 9:
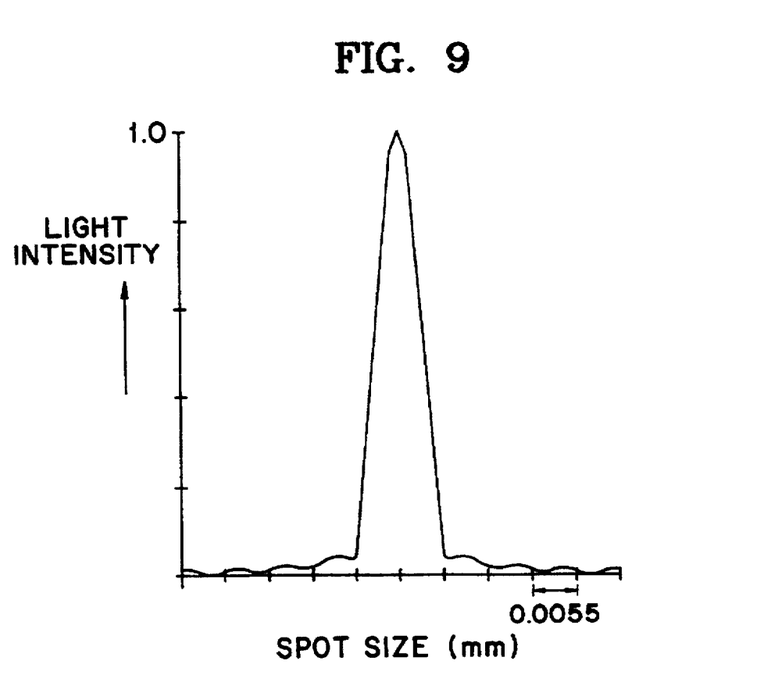

FIGS. 8 and 9 showing the test results adopting the above lens data are profiles of light intensity distribution of the respective light sports formed on 0.6 mm and 1.2 mm disks, where the abscissa indicates the size of light spots and the ordinate indicates the light intensity.

As described above, the present invention utilizes two hologram devices instead of a refractive objective lens and is effective in increasing performance with a low wave-front aberration when using a short wavelength light source. Also, since a hologram device is formed on either side of a single transparent plate, the device is easy to manufacture, the fabrication efficiency of an optical pickup is improved, and the cost is reduced.

What is claimed is:

1. A dual-focus forming method for forming respective light spots on first and second disks having different thicknesses, said method comprising the steps of:
   generating a light beam from a light source;
   diffracting said generated light beam by means of a first hologram device;
   re-diffracting a zero-order transmitted light beam and 1st-order diffracted light beam of said first hologram device by means of a second hologram device,
   wherein 1st-order diffracted light beam of said second hologram device, being generated from said zero-order transmitted light beam of said first hologram device, is focused on said first disk, and 1st-order diffracted light beam of said second hologram device, being generated from said 1st-order diffracted light beam of said first hologram device, is focused on said second disk.

2. A dual-focus forming method as claimed in claim 1, wherein the 1st-order diffracted light beams of said first and second hologram devices are +1st order diffracted light beams.

3. A dual-focus forming method as claimed in claim 1, further comprising the step of collimating the light generated from said light source so as to be incident onto said first hologram device.

4. A dual-focus forming apparatus, having means for detecting a signal corresponding to light reflected from loaded first and second disks having different thicknesses, for forming respective light spots on said first and second disks, said apparatus comprising:
   a light source for generating a light beam;
   a first hologram device for diffracting said generated light beam; and
   a second hologram device for re-diffracting the light beam diffracted by said first hologram device,
   wherein 1st-order diffracted light of said second hologram device, being generated from said zero-order transmitted light beam of said first hologram device, is focused on said first disk, and 1st-order diffracted light beam of said second hologram device, being generated from said 1st-order diffracted light beam of said first hologram device, is focused on said second disk.

5. A dual-focus forming apparatus as claimed in claim 4, wherein the 1st-order diffracted light beams of said first and second hologram devices are +1st order diffracted light beams.

6. A dual-focus forming apparatus as claimed in claim 4, further comprising a collimating lens for collimating the light-generated from said light source so as to be incident onto said first hologram device.

7. A dual-focus forming apparatus, having means for detecting a signal corresponding to light reflected from loaded first and second disks having different thicknesses, for forming respective light spots on said first and second disks, said apparatus comprising:

a light source for generating a light beam; and a flat hologram lens having a first hologram device for diffracting said generated light beam on its receiving-plane and a second hologram device for re-diffracting the light beam diffracted by said first hologram device on its emitting-plane, wherein 1st-order diffracted light beam of said second hologram device, being generated from said zero-order transmitted light beam of said first hologram device, is focused on said first disk, and 1st-order diffracted light beam of said second hologram device, being generated from said 1st-order diffracted light beam of said first hologram device, is focused on said second disk.

8. A dual-focus forming apparatus as claimed in claim 7, wherein the 1st-order diffracted light beams of said first and second hologram devices are +1st order diffracted light beams.

9. A dual-focus forming apparatus as claimed in claim 7, further comprising a collimating lens for collimating the light generated from said light source so as to be incident onto said first hologram device.

10. A dual-focus forming apparatus as claimed in claim 7, wherein said hologram devices of said hologram lens are formed in a stepped pattern.

11. A dual-focus forming apparatus as claimed in claim 7, wherein said hologram devices of said hologram lens are formed in a sawtooth pattern with both being slanted in the same direction.

12. A dual-focus forming apparatus as claimed in claim 7, wherein said hologram devices of said hologram lens are formed in a sawtooth pattern with both being slanted in the opposite direction.

13. A dual-focus forming apparatus as claimed in claim 7, wherein, with respect to both 0.6 mm and 1.2 mm disks, said hologram lens has a substrate thickness of 1 mm, a substrate refractive index of 1.515, a receiving-plane hologram device objective point of $\pi 75$ mm, a receiving-plane hologram device reference light objective point of $\infty$, receiving-plane hologram device aspherical surface coefficients of $0.72e^{-2}$, $\pi 0.15e^{-1}$, $0.51e^{-2}$, $0.22e^{-2}$, $0.34e^{-3}$, $\pi 0.12e^{-3}$ and $\pi 0.92e^{-4}$, an emitting-plane hologram device objective point of $\pi 7.5$ mm, an emitting-plane hologram device reference light objective point of $\infty$, and emitting-plane hologram device aspherical surface coefficients of $0.46e^{-2}$, $\pi 0.14e^{1}$, $\pi 0.18e^{1}$, $0.92e^{-0}$, $\pi 0.27e^{-0}$, $0.43e^{-1}$ and $\pi 0.27e^{-2}$, and wherein said hologram lens is positioned 1.79 mm from said 0.6 mm disk and 2.47 mm from said 1.2 mm disk.

* * * * *